US005488530A

United States Patent [19]

De Jong

[11] Patent Number: 5,488,530

[45] Date of Patent: Jan. 30, 1996

[54] SYSTEM AND METHOD FOR PROTECTING RELAY CONTACTS

[75] Inventor: Hans E. De Jong, Rossmoor, Calif.

[73] Assignee: McDonnell Douglas Corporation, Long Beach, Calif.

[21] Appl. No.: 50,602

[22] Filed: Apr. 22, 1993

[51] Int. Cl.[6] .................... H02H 3/033

[52] U.S. Cl. .................... 361/6; 361/5; 361/8

[58] Field of Search .................... 361/3, 5, 6, 8, 361/13, 89

[56] References Cited

U.S. PATENT DOCUMENTS

| | | | |
|---|---|---|---|
| 4,504,773 | 3/1985 | Suzuki et al. | 361/3 |
| 4,618,906 | 10/1986 | Paice et al. | 361/5 |
| 4,811,163 | 3/1989 | Fletcher | 361/8 |
| 5,164,872 | 11/1992 | Howell | 361/3 |

*Primary Examiner*—Todd DeBoer
*Attorney, Agent, or Firm*—Donald E. Stout

[57] ABSTRACT

A system and method for protecting relay contacts from erosion utilizes a sensor which senses voltage change in a switch controlling a load relay. In response to operation of the switch, the sensor sends a current to a set of pass transistors which are connected in series to the load power source and the load to turn off the transistors thereby cutting off load current flow to the load. A delay element is connected in series between the sensor and the set of transistors which cuts off the current flow to the set of transistors for a period of time selected to enable the load relay contacts to fully close or fully open before conducting electrical current therethrough.

12 Claims, 4 Drawing Sheets

SYSTEM AND METHOD FOR PROTECTING RELAY CONTACTS

BACKGROUND OF THE INVENTION

The invention relates generally to relay contact protection systems and more particularly to such systems in which the relay is DC-energized and the load is a three-phase motor.

Mechanical wear of electromagnetic relays and contacts thereof is typically minimal. However, electrical contact erosion severely limits the useful life of the relay contacts. But, relay switching without current flow through the contacts eliminates arcing of the contacts and thereby greatly improves the useful life thereof. It is generally accepted by those skilled in the art that relay switching without current flow or voltage potential at the contacts thereof can increase the useful life of such relays by a factor of approximately 10. This operational mode of relay switching in which no current flow or voltage potential exists at the contacts is called "dry switching mode".

Some prior art methods for protecting relay contacts from erosion involve selective dry switching and wet switching i.e., contact switching while current is flowing therethrough. An example of such a prior art method is disclosed in U.S. Pat. No. 4,617,604 to Narimatsu. The Narimatsu method utilizes a circuit which alternates operation of a relay between a dry switching mode and a wet switching mode. The frequency and duration of the operation in the wet switching mode is dependent on the relay characteristics. The wet switching mode is utilized to remove oxidized film and other extraneous substances on the contact faces by the arcing or spark. Operation of the relay in the dry switching mode is utilized to prevent excessive abrading of the relay contacts. However, a primary disadvantage of such prior art methods is that their utilization of wet switching typically produces contact erosion and thereby shortens the relay contact's useful life.

Other prior art systems include a relay protecting circuit connected in parallel to the relay. An example of such a circuit is disclosed in U.S. Pat. No. 3,639,808 to Ritzow. The Ritzow circuit utilizes a triac connected in parallel with the contacts. The triac is controlled either by a secondary winding magnetically coupled to the relay coil or to a transformer connected in parallel to the relay coil. The triac conducts the load current for a short period of time during contact closure in order to prevent contact arcing during the closure. However, triacs are prone to triggering spontaneously when subjected to voltage transients exceeding the triac DV/DT parameter. Consequently, a primarly disadvantage of such circuits is that they are not generally reliable.

Another prior art circuit for protecting relay contacts from erosion synchronizes the operation of the relay with a power supply which characteristically has a known alternating current waveform. An example of such a prior art circuit is disclosed in U.S. Pat. No. 5,055,962 to Peterson. The Peterson circuit controls the actuation of the electromagnetic relay so that the relay contacts open and close at a preselected time in a power line waveform. However, such circuitry could not be utilized in a system in which the power line waveform is random and therefore not predictable.

Still other prior art systems for preventing or minimizing arcing of relay contacts utilize circuitry to interrupt the flow of alternating current when the current waveform passes through zero. An example of such a system is disclosed in U.S. Pat. No. 3,223,888 to Koppelmann. The Koppelmann device utilizes two serially connected mechanical switches which have rectifiers connected in parallel therewith. However, a primary disadvantage with such systems is that the time it takes for relay contacts to fully close (and stop bouncing) is generally much longer than the period of time when the waveform is at or proximal to the zero crosspoint. Thus, although such circuits reduce arcing, significant arcing nevertheless still remains and produces erosion of the relay contacts. Moreover, shorting of the diodes used in such circuits will result in a continuous load current supply to the load without a means of stopping the load current flow thereby resulting in undesired operation of the load. Thus, a primary disadvantage of such circuits is that they are susceptable to malfunction.

Other prior art circuits for preventing arcing of relay contacts employ an additional relay to accomplish their desired purpose. An example of such a circuit is disclosed in U.S. Pat. No. 3,046,451 to Kiesel. The Kiesel circuit utilizes a pilot relay in conjunction with the main relay to control the operation of the main relay contacts. A choke provides a time delay ensuring that the time of closure of the main contacts occurs when the alternating current voltage is at or within a few electrical degrees of the zero voltage crosspoint. However, a primary disadvantage with such circuitry is that they must be keyed to a 60-hertz AC source and therefore could not be utilized in a system having a random waveform current source. In addition, such circuitry requires both fine tuning of the adjustable choke and selection of the diode characteristics for accomplishing the desired purpose. Thus, incorporating such circuitry in many systems would be unduly labor-intensive and thus pragmatically too expensive.

Still other prior circuits for protecting relays against contact degradation incorporate circuits connected to an AC signal input which is at a random phase. An example of such a circuit is disclosed in U.S. Pat. No. 4,937,703 to Adams. The Adams circuit utilizes a detector circuit incorporated in the relay driver circuit to receive the AC signal at a random phase. The detector circuit correspondingly provides a detector signal to a threshold responsive circuit, such as a timer, which drives the relay. The detector circuit responds to both the negative as well as the positive cycle of the AC input current and thereby enables the relay contacts to close randomly upon either the positive or negative cycle of the AC signal. Such systems thus prevent transfer of material (going in only one direction) between the contacts which would otherwise significantly degrade the contacts. However, a primary disadvantage with such circuits is that they are only applicable to single phase devices. In addition, such circuits are designed to be used in systems where the relay is AC-energized rather than DC-energized.

What is needed is a relay contact protection system which does not need to be synchronized with the AC load current waveform so that it may be used in systems in which the load current phase is random. In addition, what is needed is such a system which may be used where the relay transfers current to a three-phase device. Moreover, what is also needed is such a system which is reliable and generally fail-safe so that it may be used in aircraft applications.

SUMMARY OF THE INVENTION

It is a principal object of the present invention to provide a system and method for preventing relay contact erosion for a relay which controls a load current having a random phase.

It is also an object of the present invention to provide a system and method for preventing relay contact erosion for a relay which controls a three-phase device.

It is also an object of the present invention to provide a system and method for preventing relay contact erosion for a DC-energized relay.

It is an object of the present invention to provide a system and method for preventing relay contact erosion which is generally fail-safe.

It is also an object of the present invention to provide a system and method for preventing relay contact erosion which is relatively inexpensive to manufacture and maintain.

It is another object of the present invention to provide a system and method for preventing relay contact erosion which does not require fine tuning thereof to accommodate relay system component characteristics.

It is another object of the present invention to provide a system and method for preventing relay contact erosion in which selection of components thereof is not unduly critical in achieving the purpose of preventing contact erosion.

The system and method of the present invention is specifically designed to be used in aircraft applications and, more specifically, in an aircraft trim motor system. The trim motor is typically a three-phase device. Consequently, the load current to the trim motor is of random phase. The trim motors operate trim tabs located on the aircraft horizontal stabilizer which result in up or down movement of the nose of the aircraft during flight. The trim motor is operated by a switch system which includes a pair of switches, one for bringing the aircraft nose up by corresponding movement of the trim tab and the other for bringing the aircraft nose down by corresponding movement of the trim tab. The trim motor is also operated by a cable connected device on the aircraft pedestal and is commonly exercised once in either direction (up and down) as part of the preflight check routine.

Trim motor relay contact degradation after the relay has been in service for a period of time has been a persistent problem. The trim motor relay contact degradation has led to gate delays, contact failures, and in some instances to small fires in the relays caused by carbon tracking. Consequently, the present invention controls load current going through the relays in order to, in effect, dry-switch the relays and thereby prolong the useful life of the relay contacts as well as promote safe operation thereof.

The system of the present invention utilizes a solid state controller which transfers the three-phase load current to the relay. The controller is connected in series between the load power source and the relay.

The system of the present invention also includes a sensor connected to the trim switch system which detects and responds to voltage change thereof which indicates energization or deenergization of the load relay. The sensor produces an inhibit signal which is transmitted to a delay element which feeds the signal for a selected period of time to a controller component which opens a load current circuit therein for that period of time. The period of time is selected to be of a duration which allows full closure of the load relay contacts in the event of energization of the relay or which allows full opening of the load relay contacts in the event of deenergization of the relay. Thus, in the event of energization of the relay, the period of time is selected to enable the points to close and generally stop bouncing thereafter in order to provide a generally good electrical connection at the contacts so that current may flow therethrough generally without arcing. Additionally, in the event of deenergization of the relay, the period of time is selected to enable the points to stop sliding and sticking and to open thereafter in order to prevent arcing thereof. This dry switching of the contacts effectively extends the life of the relay contacts thereby increasing their reliability and rendering them less prone to often catastrophic failures.

The opening of the load current circuit that takes place is not synchronized with the AC waveform and therefore may occur at any point in the waveform of the AC current flow. Thus, the system of the present invention is applicable to any relay system which has a load current having unpredictable or random phase as well as having multiple phase. Since relay contacts generally bounce on closing and also experience some sticking or sliding on opening as well as on closing, the actual opening or closing of the relay contacts does not happen at a specific point in time but rather during a time interval. Consequently, the period of time during which the AC load current is delayed is selected to be approximately the same duration as this time interval.

The trim switchs feed a DC current to the load relay in order to energize/deenergize the relay. However, an AC current is fed to the relay contacts. The solid state controller controls the AC current flow to the relay but does not control the relay coils i.e., it does not control energization/deenergization of the load relay. The controller includes a bypass circuit connected in parallel to the load current line. The bypass circuit provides an alternate electrical pathway between the load power source and the relay in the event of a controller current delay subsystem malfunction in order to maintain current flow between the power source and the relay.

DETAILED DESCRIPTION OF THE PREFERRED EMBODIMENT

Figure 1:
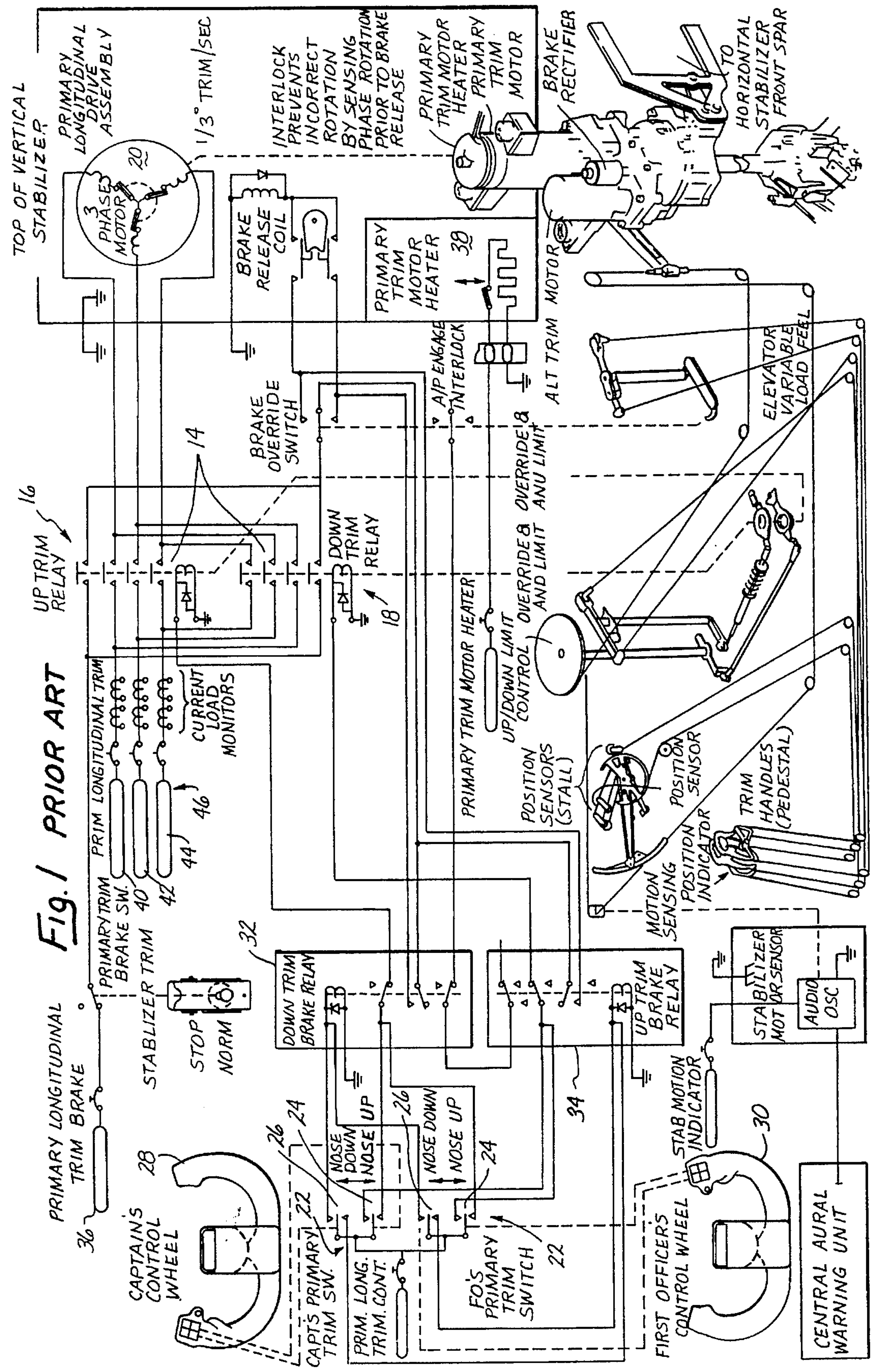
Fig. 1 PRIOR ART
FIG. 1 is a schematic diagram showing a prior art aircraft trim motor system, including a load relay, trim motor, trim switch, and associated circuits and structures thereof.

Referring now to the drawings, the relay protection system of the present invention is designated by the numeral 10. The relay protection system 10 protects the contacts 12 of up trim load relay 14 and the contacts 16 of a down trim relay 18. Load relays 14 and 18 control the AC current flowing to a load 20 which is preferably a trim motor.

Load relays 14 and 18 preferably are magnetic types of relays. Relays 14 and 18 are preferably controlled by a trim switch 22 (FIG. 17) which feeds a DC current to the coils of the relays 14 and 18 for energization thereof. The trim switch system 22 preferably includes two switches, an up switch 24 and a down switch 26 (FIG. 1). Switches 24 and 26 feed DC electrical power to the up relay 14 and down relay 18, respectively. Both trim switches 24 and 26 are preferably connected to both the captain's control wheel 28 and the first officer's control wheel 30.

FIG. 1 shows the aircraft trim motor system 11 which includes the relays 14 and 18 as well as the switch system 22. The trim motor system 11 preferably also includes a down trim brake relay 32 and an up trim brake relay 34. Relays 32 and 34 are preferably connected to the primary longitudinal trim brake 36 via up trim relay 14 and down trim relay 18, as shown in FIG. 1.

The trim motor 20 preferably also includes a primary trim motor heater 38, as shown in FIG. 1. The trim motor 20 is preferably connected to the horizontal stabilizer front spar, as shown in FIG. 1.

Figure 2:
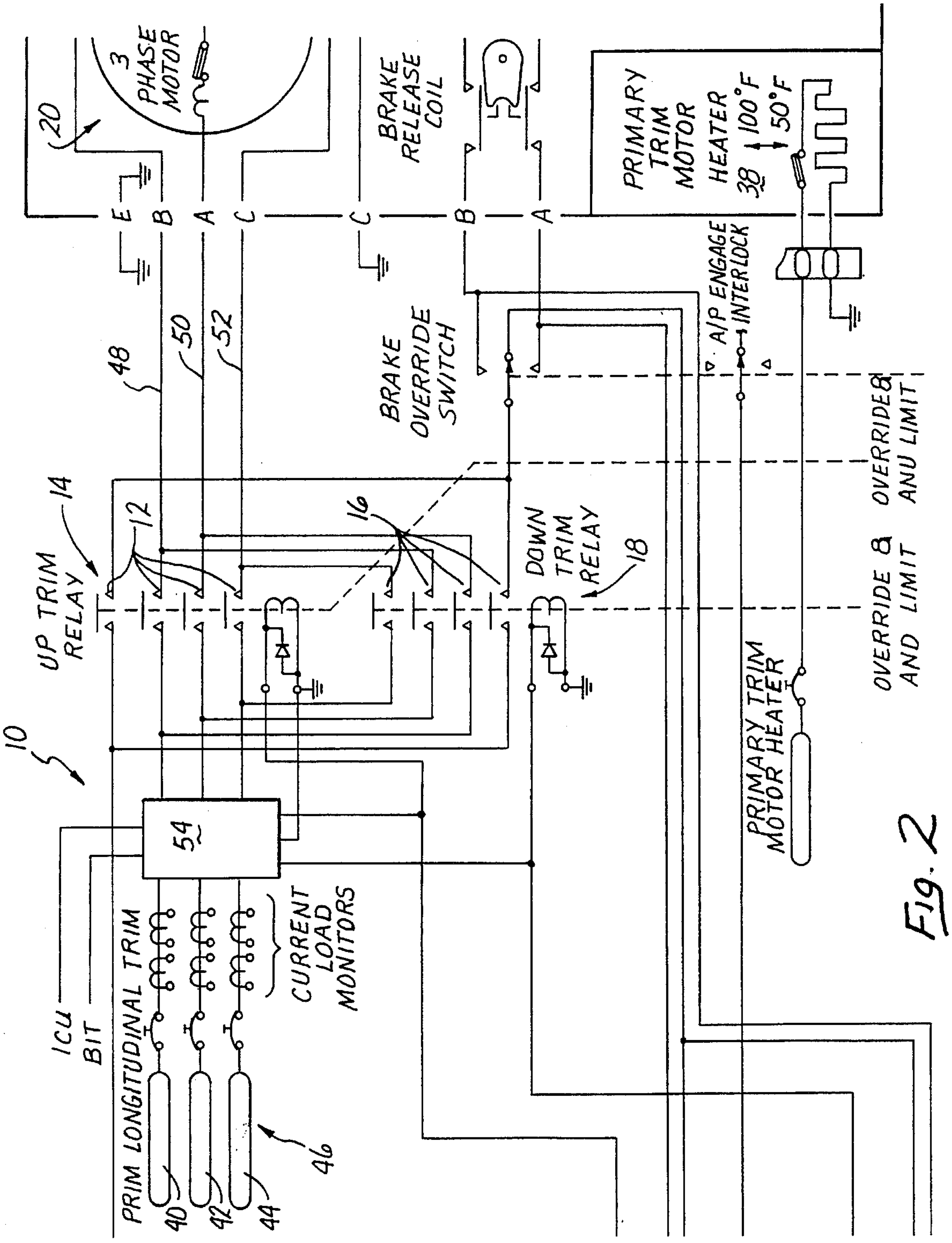
FIG. 2 is a schematic diagram-illustrating an enlarged portion of FIG. 1, wherein the depicted circuitry has been modified to include the features of the invention, and illustrating the load relay, a solid state controller, the three phase trim motor, and associated components thereof.

The primary longitudinal trim motor 20 is preferably a three-phase motor which preferably receives its alternating current electrical power from a load power source 46. The load power source 46 is preferably a three phase generator 46 which has electrical power outputs 40, 42 and 44, as shown in FIGS. 1 and 2. Outputs 40, 42 and 44 preferably are connected to trim motor 20 via power lines 48, 50 and 52. Since the trim motor 20 is preferably a three-phase motor receiving its power from three generally separate lines 48, 50 and 52, the waveform of the AC flow into the trim motor 20 is typically random. Thus, the waveforms of the power input from each of the lines 48, 50 and 52 as well as the total AC power input feeding into the trim motor 20 are both typically random.

FIG. 2 shows a portion of the circuitry shown in FIG. 1. The solid state controller 54 interconnects the power outputs 40, 42 and 44 and relays 14 and 18. The solid state controller 54 is also connected to the trim switches 24 and 26, as shown. Controller 54 is thus connected to load (or power) lines 48, 50 and 52. Consequently, due to the interpositioning of controller 54, controller 54 is able to open the electrical circuit which includes the generators 40, 42 and 44, the power lines 48, 50 and 52 and trim motor 20 in order to interrupt current flow between the generators 40, 42 and 44 and trim motor 20 for a desired period of time. This period of time is approximately that required for generally full opening and full closure of the contacts 12 and 16 upon energization and deenergization of the relays 14 and 18 and will be explained more fully hereinbelow.

Figure 3:
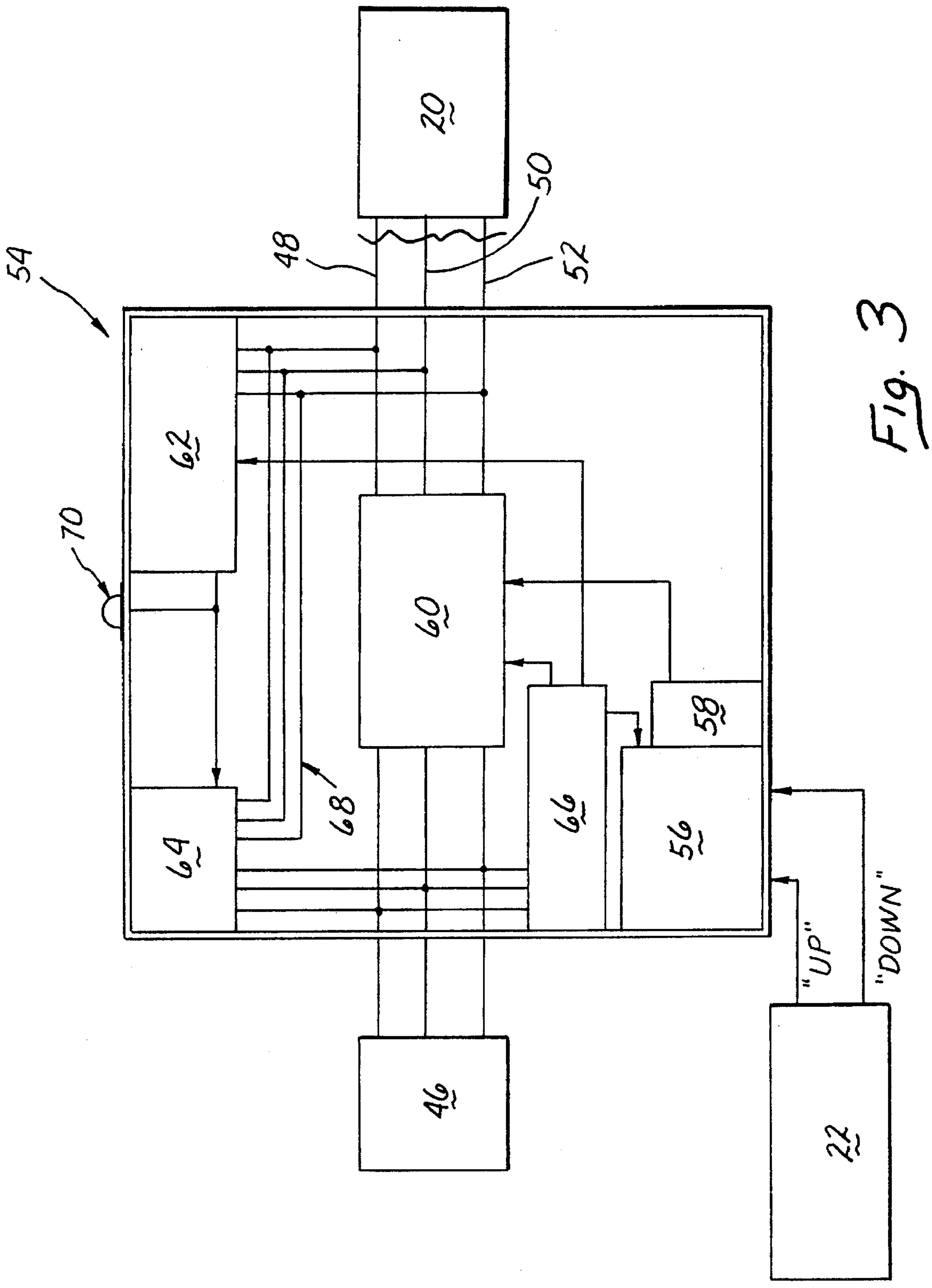
FIG. 3 is a block diagram of the solid state controller showing its connection to the load power source and the trim motor relay.

FIG. 3 shows the controller 54 in detail. The controller 54 preferably includes a trim switch sensor 56 which is connected to the trim switch system 22 in order to sense voltage change thereof. The sensor 56 is preferably connected to a housekeeping power source 66 for operation thereof. When the trim switch sensor 56 senses a voltage change at the trim switch system 22 indicating activation or deactivation thereof, it transmits a signal to a delay element 58. The sensor 56 preferably includes a pulse transformer (not shown) which gives the same polarity to the up and down signal provided by the trim switch system 22. The delay element 58 preferably includes a Schmidt trigger microcircuit (not shown) which preferably transmits a signal for a selected period of time (preferably approximately 80 milliseconds) to a set of transistors 60. The set of transistors 60 preferably are approximately 12 to 18 pass transistors which are connected also to housekeeping power source 66 and are thus normally in an on position, i.e., passing current therethrough thereby allowing current passage through power lines 48, 50 and 52. Thus, the signal from the sensor 56 and delay element 58 which is transmitted to the pass transistors 60 effectively turns the transistors 60 off and interrupts current flow therethrough thereby delaying current flow through power lines 48, 50 and 52 for the selected period of time i.e., approximately 80 milliseconds.

In the types of relays typically used in the aircraft trim motor system described hereinabove, after being energized the relay contacts will close and generally stop bouncing and sliding after a time period of approximately 80 milliseconds. In addition, for these types of relays, after being deenergized the relay contacts will open and generally stop sliding and sticking for a comparable time period. But, for other types of relays having other operating characteristics and speeds, the period of time may be either longer or shorter than 80 milliseconds. Consequently, the period of time during which the controller 54 interrupts the current flow may be correspondingly longer or shorter than 80 milliseconds for such other types of relays.

The controller 54 preferably also includes a phase/voltage sensor 62 which is connected to the housekeeping power source 66 and also connected to the power lines 48, 50 and 52. The phase voltage sensor 62 additionally is connected to a three-phase bypass relay 64 which is also connected to housekeeping power source 66 and power lines 48, 50 and 52. The bypass relay 64 is preferably connected to power lines 48, 50 and 52 at two locations thereof for each of the lines 48, 50 and 52 in order to generally be connected across the set of transistors 60 to the load power source 46 and trim motor 20. This enables the bypass relay 64 to transmit the load current from load power source 46 around the set of transistors 60 to the trim motor 20. The phase/voltage sensor 62 is connected to the set of transistors 60 via power lines 48, 50 and 52 and thereby senses if a fault occurs in the set of transistors 60. A latched indicator light 70 which is also connected to sensor 62 signals a fault condition in the set of transistors 60. If a fault in transistors 60 is sensed, sensor 62 energizes relay 64 to close the bypass circuit (or bypass power lines) 68 to allow current to flow from power source 46 to trim motor 20. Thus, phase/voltage sensor 62 and bypass relay 64 allow restoration of the original circuit by, in effect, eliminating the set of transistors 60 from the circuitry of power source 46 and trim motor 20. This results in generally fail safe operation of the invention 10.

Figures 4A, 4B, 4C:
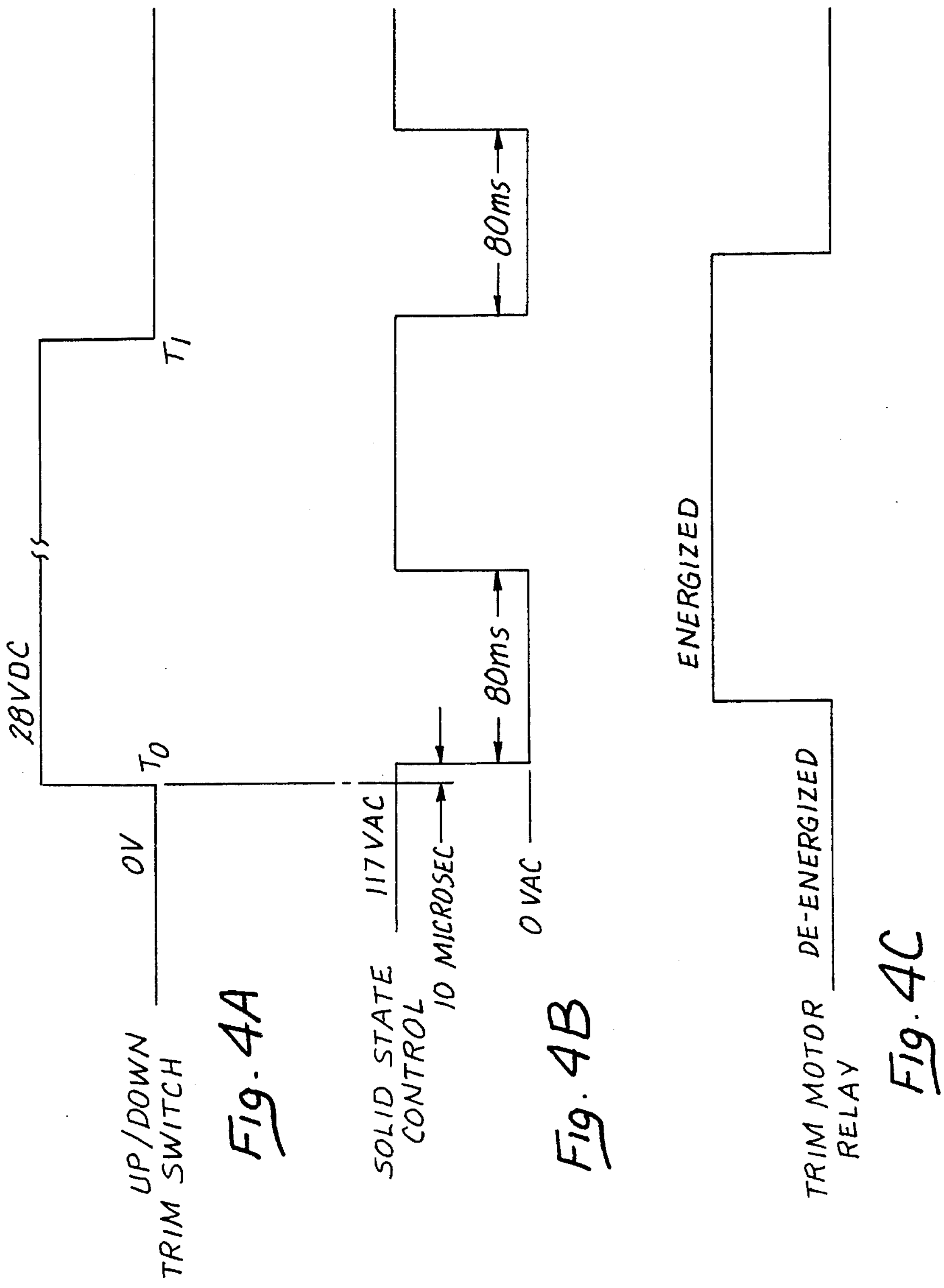
FIGS. 4A–C are graphical depictions of three interrelated operating characteristics of the invention.

FIGS. 4A–C show the interrelationship of the operating characteristics of the trim switch system 22, the controller 54 and the trim motor relay 20. Operation of the trim switch system 22 causes voltage therein to increase from 0 to 28 volts DC. However, at the same time the trim switch system 22 is operated, the set of transistors 60 in controllers 54 still have a voltage potential of approximately 117 volts AC therein. It is not until a short period of time later (approximately 10 microseconds) that the controller (more specifically the set of transistors 60 therein) respond by dropping their voltage potential down to 0. This effectively cuts off current flow between the load power source 46 and the trim motor 20. The transistors 60 remain at 0 volts AC potential for a period of time determined by the delay element 58. At a time $T_1$ when the trim switch 22 is operated so as to turn it off, the same voltage characteristics of the solid state controller 54 (more exactly the set of transistors 60) are essentially identical to those present at time $T_0$. Although the trim motor relay 14 is receiving energization current from the trim switch system 22 at time $T_0$ to energize the relay 14, the relay does not actually close the contacts until a short period of time later. This delay in energization of the relay 14 is due to the particular characteristics of the relay used. This period of time will vary according to the speed at which the relay coils are able to physically move the contacts into a closed position. The relay is energized during the time period within which there is no voltage potential in the set of transistors 60 so that there is no current flowing therethrough to erode contacts 12 of relay 14. Since the contacts do not fully close immediately but tend to bounce and slide shortly after coming in contact, the graphical depiction shows that the controller remains at zero potential after the relay 14 has become energized (or after the relay 14 has become deenergized, as the case may be). Since contact bouncing and sliding may also cause significant arcing and erosion of the contacts 12, the current flow between the power source 46 and trim motor 20 is delayed for a sufficient period of time to allow contact bounce and slide to end. As set forth hereinabove, this period of time is preferably approximately 80 milliseconds but may be more or less than this amount to accomodate other relay systems which have other relay characteristics.

Accordingly, there has been provided, in accordance with the invention, a system and method for protecting relay contacts from erosion that fully satisfies the objectives set forth above. It is to be understood that all terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

I claim:

1. A system for protecting electromagnetic relay contacts from erosion, comprising:

an A.C. load power source:

a load:

a relay for electrically connecting said load power source and said load:

a housekeeping power source;

a switch disposed in a D.C. circuit for energizing or deenergizing said relay, the circuit electrically connecting said switch and said relay;

means for sensing D.C. voltage change across said switch, said means being connected to said housekeeping power source;

a solid state component electrically connected in series between said load power source and said load, and also electrically connected in series with said sensing means;

a time delay means connected in series between the sensing means and the solid state component, said delay means further being connected to said housekeeping power source and being responsive to the sensing means for delaying A.C. current flow between the load power source and the load for a period of time selected to allow generally full closure or opening of the contacts.

2. The system of claim 1 wherein the period of time is approximately 80 milliseconds.

3. The system of claim 1, wherein said solid state component comprises a transistor.

4. The system of claim 1, wherein said solid state component comprises a plurality of transistors.

5. The system of claim 4, wherein the time delay means functions to interrupt current flow through the transistors for a period of time.

6. The system of claim 4, wherein said controller further comprises a means for bypassing current around said plurality of transistors in order to provide current flow to the load in the event of a malfunction of said transistors.

7. The system of claim 6, wherein said means for bypassing includes:

a bypass relay connected across said set of transistors to a load line interconnecting the load power source and the load;

a phase/voltage sensor connected to said plurality of transistors and to said bypass relay.

8. The system of claim 1, wherein said load power source comprises a three phase power source.

9. A system tier protecting the contacts of a D.C. energized electromagnetic relay from erosion, comprising:

an A.C. load power source;

a load;

a relay for controlling A.C. current flow from said load power source to a trim motor;

a housekeeping power source;

a trim switch for energizing or deenergizing the relay;

means for sensing D.C. voltage change of said trim switch said sensing means being connected to said housekeeping power source;

a solid state component electrically connected in series between said load power source and said load, and also electrically connected in series with said sensing means;

a time delay means connected in series between the sensing means and the solid state component, said delay means further being connected to said housekeeping power source and being responsive to the sensing means for delaying A.C. current flow between the load power source and the load for a period of time selected to allow generally full closure or opening of the contacts.

10. The system of claim 9 wherein the period of time is approximately 80 milliseconds.

11. A method for protecting contacts of a D.C.-energized electromagnetic relay from erosion, comprising:

sensing voltage change of a trim switch energizing or deenergizing through a D.C. circuit the relay controlling A.C. current flow from a load power source to a load;

delaying A.C. current flow between the load power source and the load for a period of time selected to allow generally full closure or opening of the contacts, said step of delaying being initiated in response to said step of sensing voltage change.

12. The method of claim 11 further including providing a bypass path for the AC current flow to the load in order to provide current flow to the load in the event of a delay system malfunction.

* * * * *